United States Patent Office 3,222,257
Patented Dec. 7, 1965

3,222,257
PROCESS FOR PRODUCING NUCLEOSIDES BY MICROORGANISMS
Teruo Shiro, Kanagawa-ken, Shinji Okumura, Yokohama-shi, Kanagawa-ken, Yoshio Tamagawa, Tokyo, Toshinao Tsunoda, Kanagawa-ken, and Masahiro Takahashi and Shinichi Motozaki, Tokyo, Japan, assignors to Ajinomoto Kabushiki Kaisha, Chuo-ku, Tokyo, Japan, a corporation of Japan
No Drawing. Filed Apr. 16, 1962, Ser. No. 187,948
Claims priority, application Japan, Apr. 19, 1961, 36/13,579
6 Claims. (Cl. 195—28)

The present invention relates to methods for producing inosine and guanosine by the action of microorganisms.

According to the invention, there is proposed a process for obtaining the above-noted substances by aerobically culturing biochemical mutants which are derived from *Bacillus subtilis* and which are characteristically capable of a vigorous function of producing said substances simultaneously outside of the cells thereof, the culturing being in a culture medium containing assimilable carbon- and nitrogen-containing substances, an adenine-providing substance, natural amino acid and inorganic salts at temperatures ranging from about 25° C. to about 37° C. and at a pH value within the range of from about 5 to about 9, whereby a substantial amount of inosine and guanosine is formed and then recovered.

Objects contemplated in accordance with this invention include in obtaining both inosine and guanosine in great quantity at low cost and with ease on an industrial scale by a fermentation process.

Both inosine and guanosine are constituent parts of nucleic acid and play an important role in vigorously growing cells. They may be comparatively easily converted into 5'-inosinic acid and 5'-guanilic acid respectively through chemical or biochemical phosphorylation. The converted acids as well as their salts are useful as seasoning materials. The inosine and guanosine obtained by processes of this invention will find a wide field of application in pharmacy and dietetics.

The methods of producing said substances have heretofore involved extraction from organic tissues such as the tissues of organs and muscles or from cells of microorganisms; that is, the known art requires the separation and extraction of free or, in some cases, bonded inosine and guanosine contained in materials prepared by nature. Unfortunately, this conventional method has always resulted in limited amounts of production and high cost owing to restricted resources.

However, we have succeeded in obtaining inosine and guanosine cheaply and abundantly. We have investigated microorganisms and which were capable of producing and accumulating both inosine and guanosine simultaneously in a fermentation liquid. Our method requires as main raw materials, assimilable carbon-containing substances and assimilable nitrogen-containing substances, both of which are available at low cost, and which are added to the culture liquid. Other raw materials and culturing conditions are explained in detail in the paragraphs to follow.

Through careful comparison of mutants derived from *Bacillus subtilis* by ultraviolet light, X-ray or γ-rays, based on their nucleoside producing ability and the amounts of the nucleoside accumulated by them, we found that some mutants are particularly capable of producing inosine and guanosine in a culture medium. They are polyauxotrophic mutants which require, at least, adenine as a nucleic acid component and histidine as an amino acid component. Some particular mutants, such as *Bacillus subtilis* $C_{30}$-1 (ATCC No. 14660) and *Bacillus subtilis* $C_{30}$-97 (ATCC No. 14661) require adenine as a nucleic acid component and histidine, tryptophan, methionine and tryosine as an amino acid component. A further mutant, *Bacillus subtilis* $C_{30}$-109 (ATCC No. 14662), require adenine as a nucleic acid component, and histidine, tyrosine and arginine as an amino acid component. When amino acids other than those stated above are provided in addition, growth of the mutants may be greatly enhanced.

A culture medium, to produce and accumulate inosine and guanosine simultaneously in great quantities with the bacteria noted above, should contain an assimilable carbon-containing substance, an assimilable nitrogen-containing substance, inorganic salts and nutrient substances. The assimilable carbon-containing substance is one of the main raw materials and is selected from such carbohydrates as glucose, galactose, fructose, sucrose, maltose, arabinose, xylose, molasses, starch hydrolyzate and crude sugar, or mixtures thereof, or from such polyalcohols as glycerine, sorbitol and mannitol or mixtures thereof, or from such organic acids as citric acid, gluconic acid, succinic acid, acetic acid, lactic acid, fumaric acid and malic acid or mixtures thereof.

TABLE 1

Relation between carbon sources and the production of inosine and guanosine (*Bacillus subtilis* $C_{30}$-109 (ATCC No. 14662) employed):

| Carbon sources | Inosine accumulated (g./dl.) | Guanosine accumulated (g./dl.) |
|---|---|---|
| Glucose | 0.22 | 0.16 |
| Galactose | 0.08 | 0.07 |
| Fructose | 0.26 | 0.13 |
| Sucrose | 0.17 | 0.10 |
| Maltose | 0.38 | 0.14 |
| Arabinose | 0.36 | 0.14 |
| Xylose | 0.32 | 0.09 |
| Sorbitol | 0.09 | 0.09 |
| Mannitol | 0.22 | 0.17 |
| Glycerine | 0.33 | 0.20 |
| Beet molasses | 0.14 | 0.14 |
| Cane molasses | 0.06 | 0.15 |
| Starch hydrolyzate | 0.24 | 0.01 |
| Crude sugar | 0.16 | 0.04 |

NOTE.—Ingredients of the basic culture medium: Carbon source, 5 g./dl, $NH_4Cl$, 2 g./dl, $MgSO_4 \cdot 7H_2O$, 0.04 g./dl, $KH_2PO_4$, 0.5 g./dl, $CaCO_3$ sterilized separately, 2 g./dl.; Fe++, 2 p.p.m., Mn++, 2 p.p.m., and yeast extract, 1.5 g./dl.
Conditions: Culture medium is maintained at 37° C. and at a pH of 7.0, and is subjected to shaking for 3 days.

TABLE 2

Relationship between organic acids and production of inosine and guanosine (*Bacillus subtilis* $C_{30}$-109 (ATCC No. 14662) employed):

| Organic acids | Inosine accumulated (g./dl.) | Guanosine accumulated (g./dl.) |
|---|---|---|
| Citric acid | 0.05 | 0.05 |
| Gluconic acid | 0.08 | 0.11 |
| Succinic acid | 0.01 | 0.04 |
| Acetic acid | 0.03 | 0.06 |
| Lactic acid | 0.02 | 0.03 |
| Fumaric acid | 0.05 | 0.03 |
| Malic acid | 0.03 | 0.08 |

NOTE.—Ingredients of the basic culture medium: Same as in Table 1 except using 2 g./dl. of organic acid instead of the carbon sources of Table 1.
Conditions: Culture medium is maintained at 25–30° C. and at a pH of 7.0 and is subjected to shaking for 3 days.

The assimilable nitrogen-containing substance is also a main raw material and is such may be employed $NH_4Cl$, $(NH_4)_2SO_4$, $NH_4NO_3$, $NH_4H_2PO_4$, $NH_3$, $KNO_3$, $NaNO_3$, urea or mixtures thereof, or also the ammonium salts of organic acids.

TABLE 3

Relationship between nitrogen sources and the production of inosine and guanosine (*Bacillus subtilis* $C_{30}$–97 (ATCC No. 14661) employed):

| Nitrogen sources (1 g./dl.) | Culture medium "A" | | Culture medium "B" | |
|---|---|---|---|---|
| | Inosine accumulated (g./dl.) | Guanosine accumulated (g./dl.) | Inosine accumulated (g./dl.) | Guanosine accumulated (g./dl.) |
| $NH_4Cl$ | 0.34 | 0.08 | 0.36 | 0.04 |
| $NH_4NO_3$ | 0.22 | 0.03 | 0.33 | 0.03 |
| $NaNO_3$ | 0.11 | 0.05 | 0.12 | 0.06 |
| $KNO_3$ | 0.08 | 0.07 | 0.04 | 0.02 |
| $(NH_4)_2HPO_4$ | 0.19 | 0.10 | 0.02 | 0.02 |
| $(NH_2)_2CO$ | 0.13 | 0.07 | 0.15 | 0.02 |
| $(NH_4)_2SO_4$ | 0.22 | 0.05 | 0.30 | 0.05 |

NOTE.—Ingredients of the basic culture medium: Glucose, 6 g./dl.; $MgSO_4 \cdot 7H_2O$, 0.04 g./dl.; $KH_2PO_4$, 0.5 g./dl.; $CaCO_3$ sterilized separately, 2 g./dl.; $Fe^{++}$, 2 p.p.m.; $Mn^{++}$, 2 p.p.m.
Reaction conditions: Culture medium is maintained at a pH of 7.0 and at 30° C. and is subjected to shaking for 3 days.

The culture medium "A" contains yeast extract in an amount of 1 g./dl. in addition to the above-mentioned basic culture medium. The culture medium "B" contains casamino acid (Difco) in an amount of 0.6 g./dl., adenine in an amount of 0.03 g./dl., tyrosine in an amount of 0.05 g./dl., arginine in an amount of 0.05 g./dl. and histidine in an amount of 0.05 g./dl. in addition to the above-mentioned basic culture medium.

As inorganic salts are added compounds which give magnesium ions, potassium ions, ferrous ions and phosphate ions, which are necessary for the bacteria to grow.

The bacteria to be employed in the process of this invention are poly-auxotrophic mutants which require both adenine and histidine as nutrients and they are observed to produce and accumulate inosine and guanosine also in a synthetic medium containing both adenine and histidine.

TABLE 4

Accumulation of inosine and guanosine in synthetic medium (*Bacillus subtilis* $C_{30}$–109 (ATCC No. 14662) employed):

| Adenine (mg./dl.) | Histidine, 25 mg./dl. Tyrosine, 25 mg./dl. Arginine, 25 mg./dl. | | Histidine, 50 mg./dl. Tyrosine, 50 mg./dl. Arginine, 50 mg./dl. | | Histidine, 100 mg./dl. Tyrosine, 100 mg./dl. Arginine, 100 mg./dl. | |
|---|---|---|---|---|---|---|
| | Inosine (g./dl.) | Guanosine (g./dl.) | Inosine (g./dl.) | Guanosine (g./dl.) | Inosine (g./dl.) | Guanosine (g./dl.) |
| 20 | 0.03 | 0.01 | 0.18 | 0.04 | 0.22 | 0.06 |
| 30 | 0.03 | 0.01 | 0.17 | 0.05 | 0.33 | 0.06 |
| 60 | 0.08 | 0.02 | 0.19 | 0.06 | 0.20 | 0.09 |

Ingredients of the basic medium: Glucose, 6 g./dl.; $NH_4Cl$, 2 g./dl.; $MgSO_4 \cdot 7H_2O$, 0.04 g./dl.; $KH_2PO_4$, 0.5 g./dl.; $CaCO_3$ sterilized separately; 2 g./dl.; $Fe^{++}$, 2 p.p.m., and $Mn^{++}$, 2 p.p.m.
Conditions: Culture medium is maintained at 30° C., at a pH of 7.0, and is subjected to shaking for 3 days.

TABLE 5

Effects of additional nutrients (*Bacillus subtilis* $C_{30}$–109 (ATCC No. 14662) employed):

| Additives (g./dl.) | Inosine accumulated (g./dl.) | Guanosine accumulated (g./dl.) |
|---|---|---|
| Casamino acid (Difco), 0.6 | 0.49 | 0.08 |
| Bacto-tryptone (Difco), 0.6 | 0.14 | 0.08 |
| Bacto-soytone (Difco), 0.6 | 0.19 | 0.04 |
| Polypeptone, (Wako), 0.6 | 0.20 | 0.04 |
| Beef extract, 0.6 | 0.12 | 0.10 |
| Yeast extract (Difco): | | |
| 0.6 | 0.24 | 0.19 |
| 1.5 | 0.21 | 0.17 |
| Dry yeast: | | |
| 0.6 | 0.35 | 0.04 |
| 1.5 | 0.50 | 0.06 |
| Meat extract, 0.6 | 0.25 | 0.04 |

Ingredients of the basic medium: same as in Table 3 in the case of yeast extract and dry yeast. In other cases are contained 30 mg./dl. of adenine, 50 mg./dl. of histidine, 50 mg./dl. of tryosine and 50 mg./dl. of arginine.

TABLE 6

Culture with yeast extract as additional nutrient (*Bacillus subtilis* $C_{30}$–109 (ATCC No. 14662) employed):

| Yeast extract (g./dl.) | Inosine accumulated (g./dl.) | Guanosine accumulated (g./dl.) |
|---|---|---|
| 0 | 0.40 | 0.07 |
| 0.1 | 0.29 | 0.12 |
| 0.6 | 0.22 | 0.16 |
| 1.0 | 0.23 | 0.15 |
| 1.5 | 0.21 | 0.17 |

Ingredients of the basic culture medium: Glucose, 6 g./dl.; casamino acid (Difco), 0.6 g./dl.; $NH_4Cl$, 2 g./dl.; $MgSO_4 \cdot 7H_2O$, 0.04 g./dl.; $KH_2PO_4$, 0.5 g./dl.; $CaCO_3$ sterilized separately, 2 g./dl.; $Fe^{++}$, 2 p.p.m.; $Mn^{++}$, 2 p.p.m.; adenine, 30 mg./dl.; histidine, 50 mg./dl.; tyrosine, 50 mg./dl., and arginine, 50 mg./dl.
Conditions: Culture medium is maintained at 30° C., and at a pH of 7.0, and is subjected to shaking for 3 days.

The culture medium, one composition of which is described in the foregoing paragraphs and tables, is sterilized by heat while nearly neutral and its pH value is further adjusted to neutrality thereafter, as a preparatory procedure. The thus prepared medium is readily useable for either seed culture or fermentation culture. The fermentation is aerobically conducted according to this invention at temperatures from 25° C. to 37° C. Production and accumulation of inosine and guanosine require the fermentation liquid to have pH values usually within the range from 5 to 9. The optimum pH values lie in weak acidity for inosine, and in neutrality to weak alkali- When corn steep liquor, dry yeast, yeast extract, beef extract, meat extract, adenosine, adenosine-5'-phosphate, ribonucleate, casein hydrolyzate, peptone, soy bean meal hydrolyzate or mixtures thereof are used as additives, the accumulation of inosine and guanosine is accelerated; particularly efficient are yeast extract, dry yeast and amino acid mixtures (such as Casamino acid (Difco), for example) of those noted above.

nity for guanosine, respectively. The time duration of fementation is from 2 to 4 days.

TABLE 7

Relationship between pH values and accumulation of inosine and guanosine (*Bacillus subtilis* $C_{30}$–109 (ATCC No. 14662) employed):

| pH range adjusted | pH value aimed | Inosine accumulated (g./dl.) | Guanosine accumulated (g./dl.) |
|---|---|---|---|
| 5.0–6.5 | 5.7 | 0.15 | 0.01 |
| 6.0–7.5 | 6.8 | 0.15 | 0.03 |
| 6.5–8.0 | 7.3 | 0.14 | 0.08 |
| 7.0–8.5 | 7.8 | 0.08 | 0.04 |
| 7.5–9.0 | 8.3 | 0.06 | 0.02 |

Ingredients of the basic medium: Glucose, 6 g./dl.; $NH_4Cl$, 2 g./dl.; $MgSO_4 \cdot 7H_2O$, 0.04 g./dl.; $KH_2PO_4$, 0.5 g./dl.; $CaCO_3$ sterilized separately, 2 g./dl.; $Fe^{++}$, 2 p.p.m.; $Mn^{++}$, 2 p.p.m., and yeast extract, 1.5 g./dl.
Conditions: Culture medium is maintained at 30° C., and at a pH of 7.0, and is subjected to shaking for 3 days. (N.b.: The experiments shown in Table 7 were conducted as the pH values of the media were being adjusted by means of aqueous ammonia KOH and NaOH.)

In order to recover inosine and guanosine from the culture medium on completion of the fermentation, the modified method of W. E. Cohn (described in Science; 109,377 (1949) or J. Am. Chem. Soc., 72, 1471 (1950)) is employed. Inosine and guanosine may be recovered either separately or concurrently in admixture. For example, after the cells have been removed by filtering, the filtrate is treated either with decoloring resin and an anion-exchange resin or with an anion-exchange resin and a cation exchange-resin. A relatively pure inosine and guanosine are then obtained in the form of an aqueous solution thereof. To this solution is added such a solvent hydrophilic and non-dissolving both inosine and guanosine as acetone, then the mixture of said substances deposits in pure crystals. Separating one from the other is effected by activated carbon adsorption or recrystallization as in an ordinary case of this kind.

*Example 1*

| | | |
|---|---|---|
| Glucose | g./dl. | 5 |
| Potassium dihydrogen phosphate | g./dl. | 0.2 |
| Magnesium sulphate | g./dl. | 0.04 |
| Fe ion | p.p.m. | 2 |
| Mn ion | p.p.m. | 2 |
| Dried yeast | g./dl. | 1 |
| Ammonium chloride | g./dl. | 0.4 |
| Urea | g./dl. | 0.4 |
| Calcium carbonate | g./dl. | 2 |
| Amino acids mixture (the composition is described below) | g./dl. | 0.3 |
| Polypeptone | g./dl. | 0.3 |

A culture medium consisting of the foregoing components is sterilized in an autoclave at a temperature of 115° C. for 10 minutes, and thereafter the pH value of the sterilized liquid is adjusted to about 7.3 ml. portions of said culture medium are distributed into test tubes and sterilized at a temperature of 115° C. for 10 minutes. Then mutant $C_{30}$–1 (ATCC No. 14660) of *Bacillus subtilis* is inoculated and cultivated wtih shaking at a temperature of 30° C. for 20 hours. Thereafter, 5 drops of said cultivated liquid as the seed liquid are added to 20 ml. portions of a culture medium having the same components as those of the above said culture medium in flasks of 500 ml. capacity which are sterilized at a temperature of 115° C. for 10 minutes, and the resuluting medium is then-cultivated at a temeparture of 30° C. for 65 hours. By measuring the organic base contents of the fermented liquid, it is determined that 4.1 g./l. of inosine and 1.3 g./l. of guanosine have been accumulated. The cells are filtered from this fermented liquid and an aqueous solution containing inosine and guanosine is separated from the filtrate by a conventional technique. Said mixture is adsorbed to activated charcoal (Darco) and there are eluted therefrom a solution of inosine and a solution of quanosine and inosine and guanosine are isolated by the addition of acetone. By using 3.5 l. of the foregoing fermented liquid, 10.05 g. of inosine crystals and 3.64 g. of guanosine crystals are obtained.

Composition of the amino acids mixture (percent by weight):

| | |
|---|---|
| L-alanine | 12.27 |
| L-arginine | 5.86 |
| L-aspartic acid | 13.94 |
| L-cystine | 0.54 |
| L-glutamic acid | 7.39 |
| Glycine | 6.32 |
| L-histidine | 2.50 |
| L-isoleucine | 5.09 |
| L-lysine | 7.15 |
| L-leucine | 8.95 |
| L-methionine | 0.70 |
| L-phenylalanine | 1.21 |
| L-proline | 7.49 |
| L-serine | 11.28 |
| L-threonine | 5.19 |
| L-tyrosine | 0.65 |
| L-valine | 6.35 |

*Example 2*

Using a culture medium with the same components as those used in Example 1 but with 0.3 ml./dl. of corn steep liquor added and using mutant $C_{30}$–97 (ATCC No. 14661) of *Bacillus subtilis* and cultivating the same with shaking at a temperature of 30° C. for 65 hours, 3.9 g./l. of inosine and 1.7 g./l. of guanosine are accumulate. On separating with a method similar to that used in Example 1, 3.5 l. of the cluture liquid gave 9.83 g. of inosine crystals and 4.58 g. of guanosine.

*Example 3*

By substituting for the fermentation bacteria of Example 2 *Bacillus subtilis* $C_{30}$–109 (ATCC No. 14662) and fermenting as in Example 2, 0.38 g./dl. of guanosine and 0.45 g./dl. of inosine were accumulated in the fermented liquid.

What is claimed is:

1. A method for producing inosine and guanosine which comprises aerobically culturing a biochemical mutant derived from *Bacillus subtilis*, which has a vigorous function of simultaneously producing inosine and guanosine outside the cells of the mutant and which require at least adenine and histidine for growth, in a culture medium containing an assimilable carbon-containing substance, an assimilable nitrogen-containing substance, an adenine-providing substance, histidine, and an inorganic salt adapted to contribute to the growth of said mutant, at temperatures ranging from about 25° C. to about 37° C. and at a pH range from about 5 to about 9 whereby a substantial amount of inosine and guanosine is accumulated in culture liquid and recovering the inosine and guanosine.

2. A method according to claim 1, wherein the mutant of *Bacillus subtilis* is a strain selected from the group consisting of $C_{30}$–1 (ATCC No. 14660), $C_{30}$–97 (ATCC No. 14661) and $C_{30}$–109 (ATCC No. 14662).

3. A method according to claim 1 wherein the culture medium further includes a substance selected from the group consisting of tyrosine and arginine.

4. A method according to claim 1, wherein the inorganic salts are compounds providing magnesium ions, potassium ions, manganous ions, ferrous ions and phosphate ions.

5. A method according to claim 1, wherein the aerobic condition is effected by aeration and agitation.

6. A method according to claim 1, wherein the aerobic condition is effected by shaking said medium.

References Cited by the Examiner
UNITED STATES PATENTS

| | | | |
|---|---|---|---|
| 3,111,459 | 11/1963 | Motozoki et al. | 195—28 |
| 3,118,820 | 1/1964 | Uchida | 195—28 |
| 3,135,666 | 6/1964 | Hara et al. | 195—28 |

A. LOUIS MONACELL, *Primary Examiner.*

ABRAHAM H. WINKLESTEIN, *Examiner.*